United States Patent
Maier

(10) Patent No.: US 9,341,145 B2
(45) Date of Patent: May 17, 2016

(54) SUPERCHARGED TURBOCOMPOUND HYBRID ENGINE APPARATUS

(75) Inventor: Christian Maier, Arbon (CH)

(73) Assignee: FPT MOTORENFORSCHUNG AG, Arbon (CH)

( * ) Notice: Subject to any disclaimer, the term of this patent is extended or adjusted under 35 U.S.C. 154(b) by 261 days.

(21) Appl. No.: 14/122,320

(22) PCT Filed: May 30, 2012

(86) PCT No.: PCT/EP2012/060119
§ 371 (c)(1),
(2), (4) Date: Nov. 26, 2013

(87) PCT Pub. No.: WO2012/163955
PCT Pub. Date: Dec. 6, 2012

(65) Prior Publication Data
US 2014/0195134 A1 Jul. 10, 2014

(30) Foreign Application Priority Data
May 30, 2011 (EP) ..................................... 11168087

(51) Int. Cl.
*F02B 33/44* (2006.01)
*F02M 25/07* (2006.01)
(Continued)

(52) U.S. Cl.
CPC .......... *F02M 25/0704* (2013.01); *F02B 37/004* (2013.01); *F02B 37/013* (2013.01); *F02B 37/10* (2013.01); *F02B 37/14* (2013.01);
(Continued)

(58) Field of Classification Search
CPC ........ F02B 37/013; F02B 37/04; F02B 37/10; F02B 37/105; F02B 37/18; F02B 37/004; F02B 37/14; F02B 37/16; F02B 39/10; F02B 41/10; F02D 2200/0414; F02D 41/0007; Y02T 10/144; F02M 25/0704
USPC ........... 123/559.1, 559.2, 562, 563, 564, 565; 60/612, 605.1, 598, 607; 701/101
See application file for complete search history.

(56) References Cited

U.S. PATENT DOCUMENTS 6,546,736 B2 * 4/2003 Rakhmailov ............ F02C 6/006
60/39.183
6,848,249 B2 * 2/2005 Coleman ................... F02C 3/13
60/39.17

(Continued)

FOREIGN PATENT DOCUMENTS

EP 0352064 1/1990
EP 2042705 1/2009

(Continued)

*Primary Examiner* — Hai Huynh
*Assistant Examiner* — Gonzalo Laguarda
(74) *Attorney, Agent, or Firm* — Stetina Brunda Garred & Brucker

(57) ABSTRACT

The present invention is relative to a engine apparatus comprising a combustion engine, a low pressure compressor connected to a high pressure turbine. The apparatus also comprises a low pressure turbine and a high pressure compressor. The engine apparatus according to the invention comprises an electrical torque converter comprising at least an electric generator connected so as to be driven by said low pressure turbine and a first electric motor connected so as to drive said high pressure compressor. The torque converter also comprises electronic conversion means suitable to convert the electric energy produce by said electric generator and to power supply and control at least said first electric motor.

12 Claims, 5 Drawing Sheets

(51) Int. Cl.
    *F02B 37/00*         (2006.01)
    *F02B 37/013*       (2006.01)
    *F02B 37/10*         (2006.01)
    *F02B 37/14*         (2006.01)
    *F02B 37/16*         (2006.01)
    *F02B 39/10*         (2006.01)
    *F02B 41/10*         (2006.01)
    *F02D 28/00*         (2006.01)

(52) U.S. Cl.
    CPC ................ *F02B 37/16* (2013.01); *F02B 39/10* (2013.01); *F02B 41/10* (2013.01); *F02D 28/00* (2013.01); *Y02T 10/144* (2013.01); *Y02T 10/163* (2013.01)

(56) References Cited

U.S. PATENT DOCUMENTS

| | | | |
|---|---|---|---|
| 8,943,823 B2 * | 2/2015 | Fiveland | .................. F01N 5/02 123/562 |
| 2004/0194466 A1 * | 10/2004 | Kawamura | ............... F02B 33/34 60/612 |
| 2008/0047525 A1 * | 2/2008 | Morizane | ................ F02B 37/04 123/344 |
| 2009/0094978 A1 * | 4/2009 | Yamagata | ............. F01N 13/107 60/602 |
| 2009/0146615 A1 * | 6/2009 | Zillmer | .................... B60K 6/48 322/23 |
| 2009/0211260 A1 * | 8/2009 | Kesseli | ..................... F02C 1/02 60/786 |
| 2009/0288392 A1 | 11/2009 | Yang et al. | |
| 2010/0288571 A1 * | 11/2010 | Dewis | ...................... B60K 3/04 180/165 |
| 2011/0094486 A1 | 4/2011 | Vuk | |
| 2012/0000204 A1 * | 1/2012 | Kesseli | ................... F02C 3/107 60/778 |

FOREIGN PATENT DOCUMENTS

| | | |
|---|---|---|
| WO | WO2011009693 A1 | 1/2011 |
| WO | WO2011009793 | 1/2011 |

* cited by examiner

TC2 = Double Turbocompound
2Stage = Two stage Turbocharging
VTG = Variable turbine geometrie
TCD = Turbocompound
iTC = Inversed Double Turbocompound (according to the present invention)

SUPERCHARGED TURBOCOMPOUND HYBRID ENGINE APPARATUS

CROSS REFERENCE TO RELATED APPLICATIONS

The present application claims priority to PCT International Application No. PCT/EP2012/060119 filed an May 30, 2012, which application claims priority to European Patent Application No. 11168087.2 filed May 30, 2011.

STATEMENT RE: FEDERALLY SPONSORED RESEARCH DEVELOPMENT

Not Applicable.

BACKGROUND

1. Field of the Invention

The present invention relates to a super-charged turbocompound hybrid engine apparatus and a control method of such apparatus, in particular for industrial vehicles. The invention finds application also in the field of marine engines, transport vehicles and agricultural applications, independently from the kind of feel, gasoline, diesel, gas or hydrogen.

2. State of the Art

Two-stage turbocharging has been proposed as a means of achieving high efficiency in engines, in particular heavy duty diesel engines, such as those for industrial vehicles or ships. Two turbosuperchargers are placed in series on the engine intake line, driven by turbines placed on the exhaust line, which can also be placed in series, or arranged in another way.

The turbocompound solution comprises two turbines placed in series on the exhaust line, where the low pressure one is connected to the crankshaft of the diesel engine by means of a step down gear. Therefore, such second turbine provides a supplementary torque to the engine.

A double turbocompound scheme is disclosed by the patent EP2042705. It shows a high pressure turbine and a low pressure turbine arranged on the exhaust line. Such turbines may be placed in parallel or in series between each other by means of appropriate connections and reduction valves, especially when the two turbines are parallel configured, due to the different characteristics of the two turbines.

The high pressure turbine is mechanically connected with a high pressure supercharger.

The low pressure turbine is connected to the crankshaft by means of a mechanical link. The link comprises means to reduce the speed variations, placed between the second turbine and crankshaft, as in the case of conventional turbocompound engines. Moreover, such mechanical link also connects a low pressure supercharger, arranged on the intake line, upstream with respect a high pressure supercharger, the latter being directly connected to the intake of the combustion engine.

Driven Compressor and Powerturbine are coupled via hydrodynamic clutch and redaction gear to the engine. The job of the hydrodynamic clutch is to reduce the torque oscillation from crankshaft to the Turbomachinery gears. An additional function of the clutch in EP2042705 is to connect and disconnect the driven Compressor and Powerturbine from the engine. This function enable to run the system as a free running low pressure turbocharger with some additional gear friction losses.

WO 2010/066452 teaches to manage the slip of the hydrodynamic clutch boost, for controlling backpressure, of exhaust gases, and EGR.

The low pressure supercharger receives mechanical energy from the engine or also from the low pressure turbine via such link.

DE 102005003714 shows a two stage compound system. Thanks to this scheme, the driven low pressure compressor needs high energy to generate boost. However, the controllability of the mechanical driven low pressure compressor is hard to handle.

A classic turbocompound scheme is able to provide a fuel consumption reduction, ranged between the 5 and 10%, and a better power density ranged between the 100 and 110%, with respect to a combustion engine provided with variable turbine geometry (VTG).

Power density is defined as Power [kW]/engine displacement [l (liter)] so called specific power output. This output is between 30-34 kW/l for modern heavy duty diesel systems with electronic controllable VTG. Two stage and two stage compound systems can reach 50 kW/l.

At the opposite, a classic two stage turbocharged scheme is able to provide a lower fuel consumption reduction, ranged between the 0% and 5% and a better power density ranged between the 115 and 130% with respect to a VTG scheme. The term turbocharger is synonymous with supercharger or compressor.

It's also known, a so called, "electric turbo-compound scheme" comprising a high pressure supercharger axially connected with a high pressure turbine and a low pressure turbine axially connected with an electric generator which produces electric energy. An electric motor is also connected with the crankshaft of the combustion engine. A first inverter converts the energy produced by the electric generator in direct current injected in a DC bus and a second inverter, connected with said DC bus, is suitable to power supply the electric motor. The latter supplies a supplementary torque to the combustion engine.

With respect to the mechanical turbo-compound scheme. In the electric scheme the low pressure turbine is therefore disconnected from the engine crankshaft and that means it is not affected by the engine oscillations. At the same time also the transmission of the supplementary torque to the crankshaft of the combustion engine can be performed in an independent way by means of the electric motor connected to the crankshaft.

Although such undoubted advantages with respect to the mechanical schemes, anyway also known electric turbo-compound schemes does not allow to overcome appreciably some drawbacks such as the low power density and the high fuel consumption. Moreover the known electrical schemes and the known mechanical schemes do not allow an appreciable recuperation strategy as well as an markedly transient performance.

SUMMARY OF THE INVENTION

Therefore it is the main object of the present invention to provide a supercharged turbo-compound engine apparatus which allows to overcome the drawbacks above indicate. Within this object a first purposes is to provide a supercharged engine apparatus which allows a fuel consumption reduction and an increase of the power density. Another purpose of the present invention is to provide an engine apparatus which allow less smoke both in transient and static operation. Another purpose is to provide an engine apparatus which allow best transient performances with respect to the know solutions. Moreover another purpose is to provide an engine apparatus in which the exhaust temperatures could be markedly decreased to stay below the limit of the used materials.

Not the least purpose of the present invention is to provide an engine apparatus which is reliable and easy to manufacture at competitive costs.

This main and these objects are achieved by an engine apparatus according to what reported in Claim 1. As below specified many advantages can be achieved by means of the present invention. Firstly the engine apparatus allows the assets of the two stags turbo-charging systems single and double turbo-compound systems. In view of the connections between the turbines and the superchargers of the engine apparatus, the scheme of this invention is also named as "turbo-compound engine with inverse two stage turbo charging".

In particular, the scheme comprises:
  a. Low pressure compressor is driven by the high pressure turbine, through a shaft
  b. High pressure turbine and low pressure turbine connected serially on the exhaust pipe,
  c. Low pressure compressor and high pressure compressor connected serially on the fresh air pipe.

The engine apparatus according to the invention allow to obtain a continuous adjustment of the speed of the high pressure compressor and a precise control of the low pressure turbine. In view of their electrical drive, the low pressure turbine and the high pressure compressor are not affected by the engine oscillations and are independent from the engine speed and engine load. Moreover in the engine apparatus according to the invention the high pressure compressor and the low pressure turbine can work independently each other with different speeds. This aspect allows to reach an optimum efficiency.

The engine apparatus according to the invention also allows to achieve a better transient performance. Indeed according to the invention the high pressure compressor can be operated (by means of an electric motor) only when a particular condition occurs. In this regard according to a control strategy of the present invention, the high pressure compressor is operated when at least one of the following conditions occurs:
  an exhaust temperature exceeds a predefined value;
  the Lambda value exceeds a predefined value;
  the pressure ratio of fee intake line exceeds at least, a surge value of the low pressure compressor,
  the engine brake means are activated,
  the engine speed is below a predefined value.

Therefore in the engine apparatus according to the invention, for about 80% of the driving cycle the driven high pressure compressor can be advantageously deactivated. This aspect allow an optimum recuperation with a higher power density with respect to the traditional engine apparatus.

The dependent claims disclose preferred embodiment of the present invention, forming integral part of the present description.

The claims disclose preferred embodiments of the present invention, forming integral part of the present description.

BRIEF DESCRIPTION OF THE DRAWINGS

The invention will become fully clear from the following detailed description, given by way of a mere exemplifying and non limiting example, to be read with reference to the attached drawing figures, wherein.

The same reference numerals and letters in the figures designate the same or functionally equivalent parts.

DETAILED DESCRIPTION OF THE INVENTION

Figure 1:
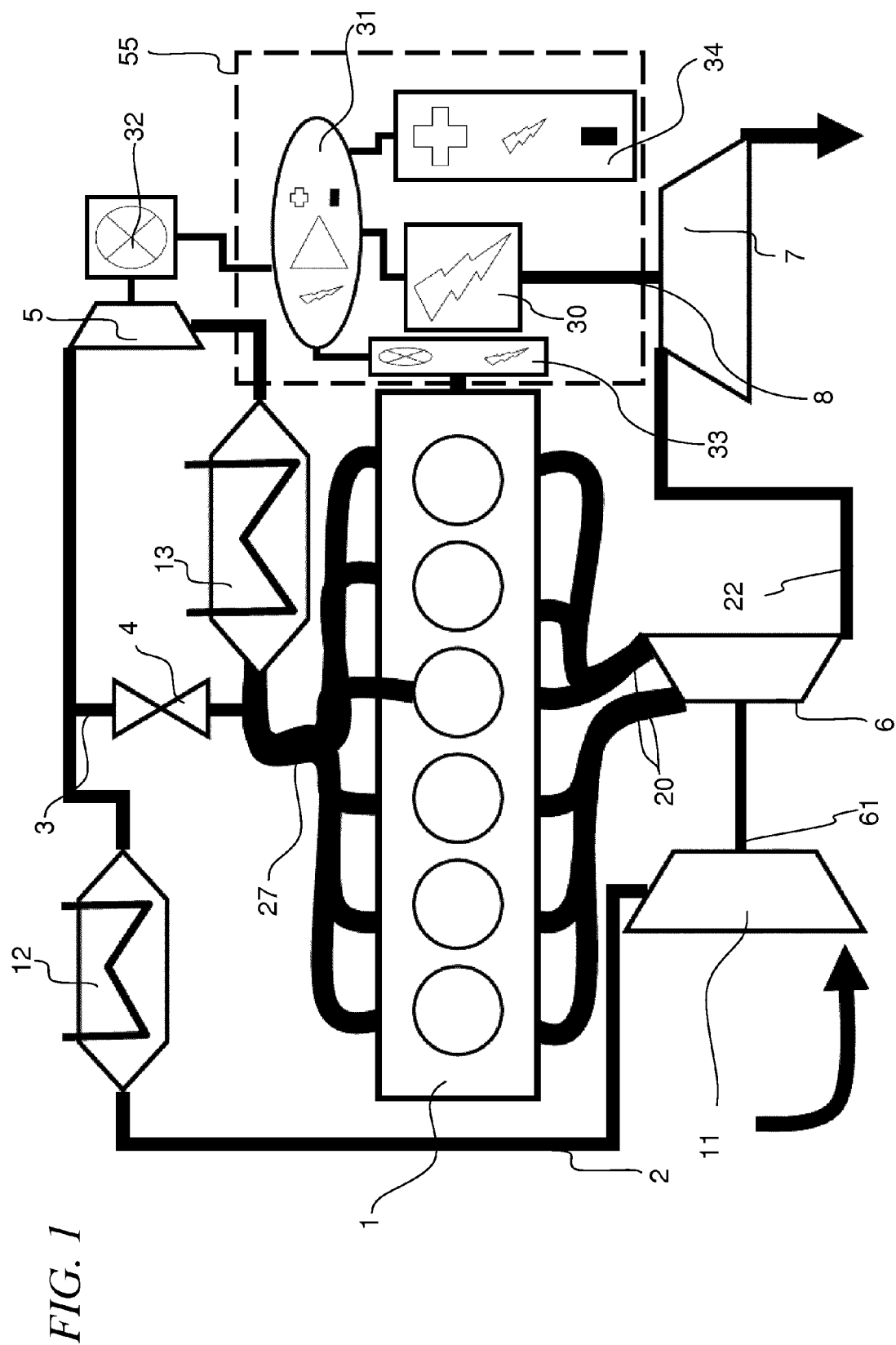
FIG. 1 shows a first embodiment of an engine hybrid apparatus according to the invention.

FIG. 1 is a schematic view of an engine apparatus according to the present invention. As below better specified, the engine apparatus comprises a mechanical assembly and an electric assembly. For this reason in the following the engine apparatus 1 is also named as "hybrid apparatus". The engine apparatus, for example of an industrial vehicle, of a ship or of another type, comprises the internal combustion engine 1, which is preferably a diesel engine. The apparatus also comprises an intake line 2 of the engine 1 and an exhaust line 20. Starting from the fresh air admission, on said intake line 2 are sequentially connected, according to the route of the fresh air:
  a low pressure compressor unit (LPC) 11,
  a low pressure interstage cooler (LPIC) 12,
  a high pressure compressor (HPC) 5,
  a high pressure charge air cooler (HPCAC) 13.

The intake line 2 comprises first bypass means 3,4 for bypassing the HPC 5. More in detail such bypass means comprises a pipe 3 and a valve 4. A first end of the pipe 3 is connected downstream the LPIC 12 while a second end of the pipe 3 is connected downstream the HPACAC 13. This solution allows to reduce the pressure loss along the intake line when the first passing means 3,4 are activated that is when the valve 4 is opened and the air flows through the pipe line 3. However, it has to be noted that such coolers 12, 13 are actually optional.

With reference to the exhaust line 20, starting from the engine 1, on said exhaust line 20 are sequentially connected, according to the route of the exhaust gasses, a high pressure turbine (HPT) 6 and a low pressure turbine (LPT) 7.

The skilled person in the art knows what "low pressure" or "high pressure" turbine means and "low pressure" or "high pressure superchargers means" in terms of flow masses, pressures and enthalpies and in view of series connections of such components. Therefore, it is also clear what "high" or "low" define clearly the features of a supercharger or of a turbine in this context. In this regard in the following description the term "compressor" and the term "supercharger" are used with the same meaning.

According to the invention, the LPC 11 is directly and operatively connected to the HPT 6. More precisely the LPC 11 is driven by the HPT 6 by means of an axial shaft 61. Moreover the HPT 6 is preferably connected to the engine 1 by a double connection (twin entry). This solution allows a better transient performance at low speed by gaining the pressure pulsation of the exhaust manifold at a line cylinder engine. In this regard, the direct connection of the engine is rarely subjected to constant exhaust pressure. In pulse turbo-charged diesel engines, twin-entry turbines allow exhaust gas pulsations to be optimised, because a higher turbine pressure ratio is reached in a shorter time. Thus, through the increase of the pressure ratio, positive jetting flow, by improving the all-important time interval when a mass flow with high density is passing through the turbines.

As a result of this condition, improved exhaust gas energy utilisation, the boost pressure characteristics of the engine and, hence, the torque behaviour are improved, particularly at low engine speeds.

As shown in FIG. 1, in order to prevent the various cylinders from interfering with each other during the charge exchange cycles, half number of cylinders are connected into one exhaust gas manifold 20 which forms the "outlet" of said combustion engine 1. Therefore the twin-entry of the HPT 6 allows the exhaust gas flow to be fed separately through the turbine. According to the present invention, the engine apparatus comprises an electric torque converter 55 provided for driving the HPC 5 and for providing torque to the crankshaft of the combustion engine 1. More in detail the electric torque converter 53 comprises an electric generator 30 preferably an alternator, having a rotor coincident or rotationally associated with the LPT 7 shaft 8. The electric torque converter 55 comprises and first electric motor 32 which is connected to the HPC 5 to operate the HPC itself. Moreover the converter 55 also comprises electric conversion means 31, 34, 39 suitable to convert the electric energy produced by the generator 40 and suitable to power and control at least said electric first electric motor 32.

The electronic conversion means comprise an inverter 31 to which the electric generator 30 is electrically connected. Such inverter 31 is also electrically connected to the first electric motor 32. According to the embodiment shown in FIG. 1, the torque converter 55 also comprises a second electric motor 33 electrically connected to the inverter 31 and mechanically connected to the crankshaft of the combustion engine 1 in order to provide a supplementary torque.

In any case, the torque converter 55 also comprises an accumulator 34 which can be a battery or a DC bus. Such accumulator 34 is electrically connected to the generator 311 through the inverter 31.

Always with reference to the scheme in FIG. 1, the electric energy produced by the generator 30 can be used to operate, by means of the inverter 31, the first electric motor 32 in order to operate the HPC 5 or the second electric motor 33 in order to provide torque to the crankshaft of the combustion engine 31. However in function of the operative needs of the apparatus, the energy produced by the generator can also stored, through the inverter 31, into the battery/DC bus. As a consequence, the instantaneous torque provided to the first electric motor 32 can be decoupled from the electric energy instantaneously produced by the generator 30 thanks to the accumulator 34 (e.g. battery/DC bus).

Figure 2:
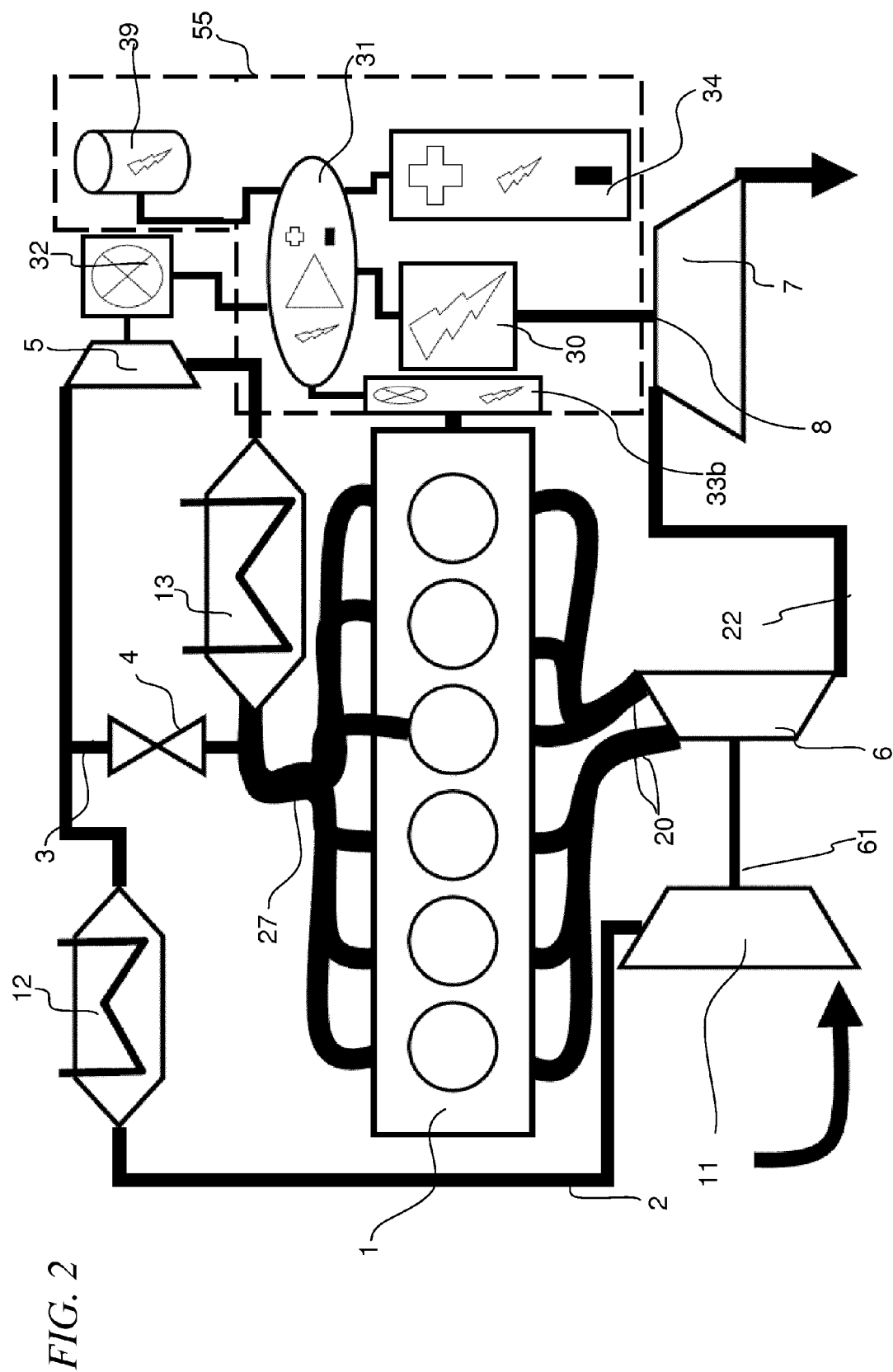
FIG. 2 shows a second embodiment of an engine hybrid apparatus according to the invention.
Figure 3:
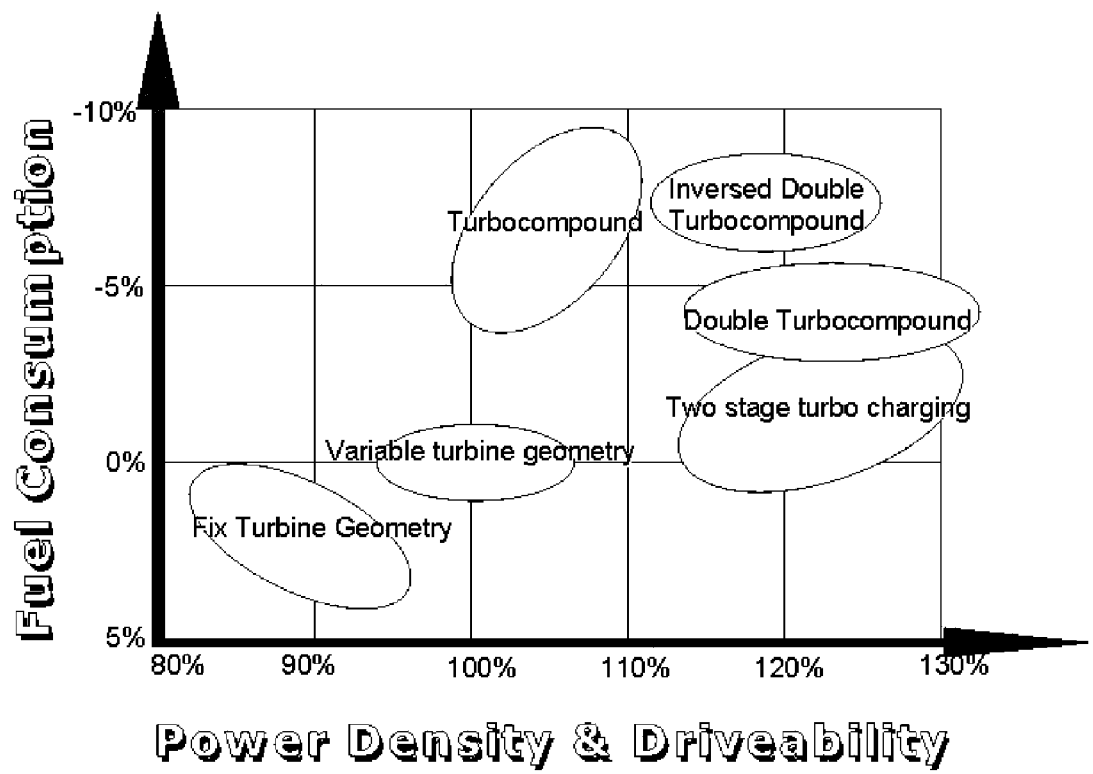
FIG. 3 shows a comparison between the performance of known apparatus and an apparatus according to the present invention.

According to a second embodiment shown in FIG. 2, the electronic conversion means of electric torque converter 55 preferably comprises also a condenser 30 which is operatively managed by means of the inverter 31. The first electric motor 32 can get power out of the condenser 39 in case of a short term demand and out of the accumulator (battery/DC bus 34) in case of long term demand. This allows to improve the transient performance of the high pressure compressor 5. The electric power stored in the condenser 39 is controlled and distributed by the coupled inverter 31 to the first electric motor 32.

For the purpose of the present invention, the expression "short, term demand" means a demand of power having a duration shorter than a minute. A "short term demand" can be, for example, a demand of the driver to complete an overtaking, to ramp up over a short hilly area or to drive in a stone area with wheels loaded. On the contrary the expression "long term demand" means a demand of power whose duration is more than two minutes. A long power demand could be requested for driving the vehicle over an hill for long time or for driving a boat against the wind and/or waves or also for driving a vehicle in a muddy area with high resistance.

With respect to the solution in FIG. 1, in the embodiment in FIG. 2 the electric torque converter 55 also comprises an electric asynchronous machine 33b connected to the crankshaft of the combustion engine 1. As below better specified, the asynchronous machine 33b can intervene according to three main operating modes:

it can work as a "generator" by providing brake so as to recuperate brake energy which is converted in electric energy stored, via the inverter 31, into the accumulator 34 and or into the condenser 39; that allows to reduce the charge on the brakes of the vehicle so as to reduce the abrasion and to obtain a longer life time;

it can work as an "electric motor" to provide to the crankshaft of the combustion engine 1 a supplementary torque usable for a short power demand (boosting);

it can work as an "electric motor" to support the combustion engine for long power demand so as to reduce the power of the engine by reducing consequently fuel consumption and by increasing she energy recuperation.

Therefore according to a first possible operating mode, the synchronous machine 33b can advantageously support the engine apparatus during the braking or deceleration by generating negative torque, in such condition, by means of the intervention of the inverter 31, the asynchronous machine works as a "generator" by producing electrical power which is primarily stored in the condenser 39, if the electric condenser is already charged, then the electrical power generated is stored into the accumulator 34. The management of the power generated by the asynchronous machine 33b is performed by the inverter 61 and by control means (ECU) which operates on the inverter 31.

On the contrary when the engine apparatus is accelerating, the inverter 34 changes the operative configuration of the asynchronous machine 33b which can work as a second electric motor of the electric torque converter 55. In particular in such condition, for short term demand the electrical power for operating the asynchronous machine 33b is provided, via the converter 31, by the condenser 39, while in case of long term demand it is provided, always via the converter 31, by the accumulator 34. In case of long term demand, the electrical power could be provided to the asynchronous machine also directly by the generator 30.

Hence, on the basis of what above, the HPC 5 is controlled by means of the first electric motor 32 which can be feed, trough the inverter 61, directly with the energy coming from the generator 30 or with the energy stored in the battery/DC bus 34. The first electric motor 32 is activated when the first bypassing means 3,4 have been previously or concurrently deactivated. More in detail, when the first bypassing means 3,4 are activated/operated (that is when the valve 4 is opened) the air flow coming from the LPC 11 is bypassed into the pipe line 3. In such condition the HPC 5 is normally not operated by the first electric motor 32. On the contrary when the first bypassing means 3,4 are deactivated (that is when the valve 4 is closed) the entire air flow crosses the HPC 5. In such conditions, the HPC 5 can be operated by the first electric motor 32 in order to increase the pressure ratio of the air flow for the purposes below indicated.

With reference particularly to the solution in FIG. 2, according to the present invention, the engine apparatus 1 above explained can advantageously works at least according to the following operative configurations:

1) a first configuration called "single stage configuration" in which the LPC 11 and the HPT 6 are activated and wherein the HPC 5 is deactivated. In such configuration the asynchronous machine 33b is operated as "electric motor" in order to provide torque to the crankshaft of the combustion engine 1; in particular the asynchronous machine 33b can be operated, via the inverter 31, by means of the electrical energy stored in the battery 34/DC bus; alternatively the asynchronous machine 33b can be operated as "electric motor", always via the inverter 31, by means of the electrical energy instantaneously generated by the generator 30 connected to the LPT 7;

2) a second configuration, called "two stage configuration" in which the LPC 11 and the HPT 6 are activated and wherein also the HPC 5 is operated by means of the first electric motor 32; in this second configuration the first electric motor 32 is operated, through the inverter 31, directly by means of the electrical energy instantaneously generated by the generator 30 connected to LPT 7. In this condition the engine apparatus works as a "two stage compound apparatus" wherein the LPC 11 is operated by the HPT 6 and wherein the HPC 5 is substantially operated directly by the LPT 7;

3) a third configuration in which the LPC 11 and the HPT 6 are activated and the HPC 5 is operated by means of the first electric motor 32 which is, in its turn, operated by means of the electrical energy coming, through the inverter 31, from the accumulator 34 (battery/DC bus); in other words with respect to the second configuration, in this third configuration the electrical energy instantaneously generated by the generator 30 is stored in the accumulator 34.

What above indicated about these three operative configurations is valid also for the embodiment shown in FIG. 1 wherein a simply electric motor (second electric motor 33), not working as generator, is connected to the crankshaft of the engine apparatus.

Other than the above listed configuration 1)-3), there are other possible operative configurations in which the LPC 11 and HPT 6 work all the time. In particular, with reference again to the embodiment shown in FIG. 2, the engine apparatus can work according to:

3) a fourth configuration wherein the LPC 11 and HPC 6 work and in which the LPT 7 recover energy by operating the generator 30; in such fourth configuration the HPC 5 is deactivated and the asynchronous machine 33b is out of function; the electric energy generated by the generator 30 is stored in the accumulator 34 and/or in the condenser 39.

a fifth configuration wherein there are the same conditions of the fourth configuration for the LPC 11, the HPT 6, the HPC 5 and the LPT 7, but wherein the asynchronous machine works as a "generator" to generate electric energy stored in the accumulator 34 and/or in the condenser 39;

4) a sixth configuration wherein for the LPC 11, the HPT 6, the HPC 5 and the LPT 7 occur the same conditions of the third configuration 3) and wherein the asynchronous machine 33b works as a "generator" to generate electric energy which is stored in the accumulator 34 and/or in the condenser 39;

5) a seventh configuration wherein for the LPC 11, the HPT 6 and the HPC occur the same conditions of the sixth configuration, but wherein the LPT 7 is disconnected and wherein also the asynchronous machine 33b is disconnected because of the accumulator 34 and/or the condenser 39 are fully charged;

6) an eighth configuration wherein or the LPC 11, the HPT 6 and the HPC occur the same conditions of the sixth configuration, but wherein the asynchronous machine 33b is disconnected;

The engine apparatus according to the invention comprises control means, comprising for example an electronic control unit (ECU), which controls the inverter (31) and therefore the activation/deactivation of the high pressure compressor HPC 5 and the first bypass means 3,4. The control means ECU substantially control and manage both the mechanical assembly and the electrical assembly (electrical torque converter 55) of the engine apparatus so as to change the operative configuration of the apparatus itself from one to another.

The engine apparatus also comprises first detecting means, operatively connected to the control means ECU for detecting the temperature of said exhaust gases. In particular such temperature is detected on said exhaust line 20 before the HPT 6. The engine apparatus also comprises second detecting means of said Lambda value operatively connected to the control means ECU. Said second detecting means preferably comprises at least one pressure sensor and at least one temperature sensor arranged along the intake line 2 and connected to the control means ECU (above indicated) in order to calculate the Lambda value. More in detail the control means ECU calculate the had demand and the mass air how via the boost pressure and the temperature measured respectively by said at least one pressure sensor and said at least one said temperature sensor of said second detecting means. According to an alternative solution, the second detecting means could comprise an appropriate Lambda sensor connected operatively to the control means ECU above indicated.

The engine apparatus preferably comprises also engine brake means and an engine revolution speed sensor which can be, for example, the sensor traditionally mounted on a flywheel of the combustion engine. Moreover, the apparatus preferably comprises also at least a torque sensor for detecting the torque. Also the torque sensor is operatively connected to the control means ECU. Moreover a "fuel map" is preferably stored into control means ECU. On the basis of this fuel map and of the information coming from the torque sensor the control means ECU activate the engine brake. In this regard, if an active injection is detected then the engine brake cannot be activated. On the contrary if there is not an injection of fuel and if the speed of the engine is above a pre-established value (for example 1000 rpm), then the engine brake can be activated.

It has to be noted that in the known solutions the control means are not connected to a torque sensor. In particular in known solutions, during the firing mode, the torque is looked up in the "fuel map" which comprises data relative to engine speed, torque and fuel mass. Normally the "fuel map" is defined and controlled on test benches, in the traditional solutions, following a request of the driver, the control means deliver the fuel mass on the basis of the fuel map, but there is not any feedback from the engine in terms of torque. Moreover, in the traditional solutions, during the braking mode the control means detect no feeding of fuel and the value of the brake torque also comes out from "braking map" containing data, relative to engine speed and braking torque. Also this "braking map" is defined and calibrated on test benches.

Differently in the present invention the presence of a torque sensor communicating with the control means ECU allows to control the variations of the engine and in particular the cause of such variations. That enables to maintain the variations of the engine in a very close range and to compensate the aging and the wear during the live time.

According to the invention, the strategy of the engine apparatus 1 comprises a step of deactivating said first bypassing means 3,4 and the step of activating said HPC 5 by means of the first electric motor 32, when at least one of the following conditions occurs:
  a) the exhaust temperature exceeds a predefined value (for example above 760° C.);
  b) the Lambda values is below a predefined value;
  c) the pressure ratio at the intake line (2) exceeds at least a surge value of the low pressure compressor LPC 11;
  d) engine brake means are activated;
  e) the engine revolution speed is under a predefined value.

In other words, according to the invention, starting substantially from the first operative configuration above indicated, when at least one of the conditions a)-e) is verified then the first bypass means 3,4 are substantially closed so that the air mass flow passes through the HPC 5 to be compressed. In such condition, the HPC 3 is operated by the first electric motor 32 so as to work actively on the air mass flow. On the contrary, when the first bypass means are activated (that is when mass air flow passes through pipe 3 and valve 4) then the first electric motor 32 is deactivated so that the HPC 5 does not perform any compression of the air flow. The deactivation of the first bypassing means 3,4 is preferably performed before or simultaneously to the activation of the HPC 5 by the first, electric motor 32.

The condition a)-e) above indicated are checked by the control means ECU which subsequently intervene on the first bypass means 3,4 of the engine apparatus. The control means ECU can check all the conditions a)-e) before to intervene on the first by passing means 3,4. Alternatively the control means ECU can intervene as soon as one of the conditions a)-e) is detected independently from the other control.

In particular when the condition indicated under point a) occurs then the HPC 5 is operated by the first electric motor (32) in order to produce additional air boost, to rise up the Lambda value and to reduce the combustion temperature. With reference to the condition indicated under point b), the Lambda value is calculated from the air to fuel ratio according to the following formula:

$$\text{Lambda} = \text{AFR}/\text{AFR}_{stoichiometric}$$

wherein $\text{AFR} = m_{air}/m_{fuel}$ and $\text{AFR}_{stoichiometric}$ is defined as 14,545 for Diesel. It has been noted that the best efficiency with the least smoke is reached when the Lambda reaches values comprises in the range between 1.4-1.8. When the Lambda value, detected by the lambda sensor, goes out of this range them the first bypassing means 3,4 are activated/deactivated and the HPC 5 is operated/deactivated as the case. In particular if the Lambda value is lower that 1.4 the first bypassing means 3,4 are deactivated (valve 4 closed) and the HPC 5 is operated by the first electric motor 32. On the contrary when the Lambda value is higher than 1.8, then the first bypassing means are activated (valve 4 opened) and the first electric motor 32 is stopped so as to arrest the HPC 5.

With reference to the condition indicated under point c), when the engine apparatus is, for example, in the "single stage configuration" above indicated, at low engine speed (that is at low air mass flow) the pressure ratio of the LPC 11 compressor (that is the ratio between the pressures upstream and downstream the LPC 11) has to be increased in order to increase the torque at the engine. This is made by deactivating the first bypassing means 3,4 and by activating the HPC 5 by means of the first electric motor 32.

The working map of the LPC 11 is clearly limited by the surge line in increasing pressure. Operating the compressor LPC 11 over the surge line the unsteady pulses would destroy the impeller. The location of the surge line in the LPC 11 working map depends on the compressor design and manufacturer. According to the invention, in order to increase the pressure ratio at low mass airflow the HPC 5 is used. By sectioning the pressure ratio from one (LPC) to two compressors (LPC and HPC) the higher pressure ratio could be reached without crossing the surge line of the LPC 11. It is clear that at a higher mass-flow the single compressor (LPC) could reach the claimed pressure ratio without surging, so the first bypassing means 3,4 can be activated and the HPC 5 can be switched off.

With reference to the condition indicated under point d), during the braking phase of engine of the vehicle, the first bypassing means 3,4 are deactivated, and the HPC 5 (by means of the first electric motor 32) works actively on the air mass flow in order to increase the engine brake power. The engine braking mode is the result of a demand of the driver of the vehicle who by a switch or by the braking pedal for example, sends a signal to the control means which check the engine operating data and activate the braking mode. In particular the control means deactivate the first bypassing means 3,4 and operates the first electric motor 33 (that is the HPC 5) according to what above indicated.

The engine apparatus 1 preferably comprises also an Exhaust Gas Recirculation (hereinafter EGR) system for reducing the nitrogen oxides during the combustion. The EGR is controlled by the difference between the pressure at the inlet 27 of the combustion engine, that is the pressure measured in the proximity of the end of the intake line 2, and the pressure at the outlet 20b of the combustion engine 1 that is the pressure at the beginning of the exhaust line 20 upstream the HPT 6. If the pressure at the inlet 27 is higher than the pressure at the outlet 20b (negative charge cycle) exhaust gas recirculation is possible, and vice versa. Therefore according to the present invention the mass-flow of EGR is regulated by deactivating/activating the first bypass means 3, 4 and by operating the HPC 5 by means of the first electric motor 32. In such conditions the HPC 5 works on the intake air mass flow increasing the pressure at the inlet 27 and therefore restoring the conditions for the recirculation of the exhaust gases.

By summarizing what above, the engine apparatus 1 according to the invention is shifted in the "two stage configuration", by deactivating the first bypass means 3, 4 and by activating the HPC 5 compressor (via the first electric motor 32) in order to:
  to increase boost pressure and reduce exhaust gas temperature and improve transient response at low engine speed and mass flow rate, and
  to shift engine running line out of the low-pressure compressor (LPC 11) surge area in performance map, when a high pressure ratio is required at a low mass flow rate, and
  to increase engine brake power.

Consequently, a number of advantages are achieved by means of the present invention:
  the assets of the two stage turbo-charging systems single and double turbo-compound systems and the mechanical high pressure compressors are concentrated in one engine scheme,
  improving on transient engine performance,
  increasing in engine brake power,
  improving on recuperation strategy.

In order to better explain the advantages reachable by the present invention, some useful parameters are here defined:
  IMEP is the "average pressure" within an engine cylinder during a working cycle, calculated from an indicator diagram.

The "average pressure" is the pressure produced in the combustion chamber during the operating cycle. It is an expression of the theoretical, frictionless power known as indicated horsepower. In addition to completely disregarding power lost to friction, indicated horsepower gives no indications as to how much actual power is delivered to the propeller shaft for doing useful work. However, it is related to actual pressures that occur in the cylinder and can be used as a measure of these pressures. IMEP is equal to the "brake mean effective pressure" (hereinafter BMEP) plus "friction meats effective pressure (hereinafter FMEP)".

P_outlet=pressure after engine (at the outlet 20b);
p_inlet=pressure before engine (at the inlet 27);
P_engine=Power at Crankshaft
P_recuperation=Recuperation Power Any technical process of power generation is accompanied by energy losses and entropy rise. Energy dissipation occurs during transport, conversion, generation, application, and it is inevitable. In addition to the law of nature of rising entropy a large amount of energy in the form of heat is wasted. "Waste Heat Recuperation Systems" recycle a portion of some losses and thus improve the efficiency in thermodynamic cycles.

EPGE is the "Energy Potential Gas Exchange" is the energy exchanged. If the charge cycle work is positive the engine performs no work for charge and discharge the cylinder with the working fluid. So if the charge cycle work is positive the efficiency of the engine is increased (EPGE +).

If the charge-cycle work is negative the engine needs to expend some work for the gas exchange (EPGE −), therefore, the efficiency decreases.

PFRC is Power fraction Recuperation is the energy. Systems with waste heat recuperation can recycle a portion of some losses and thus improve the efficiency in thermodynamic cycles. PFRC is the percentage factor of engine power and recuperation power (from the exhaust gases to the crankshaft).

POFS=Potential of Fuel Saving (dimensionless ratio); this parameter may be described also by means of the following equations:

$$POFS=EPEG+PFRC$$

$$POFS=(IMEP/_{poutlet}-P_{inlet})+(P_{engine}/P_{recuperation})$$

Therefore, EPEG and PFRC influence the engine efficiency.

Systems with exhaust gas recuperation usually have a higher backpressure (gas pressure at outlet) and a negative charge cycle work.

Standard two stage turbocharging system cannot recuperate energy but they could reach a positive charge cycle work. Negative effects of EPEG can be compensated by increasing PFRC.

Figure 4:
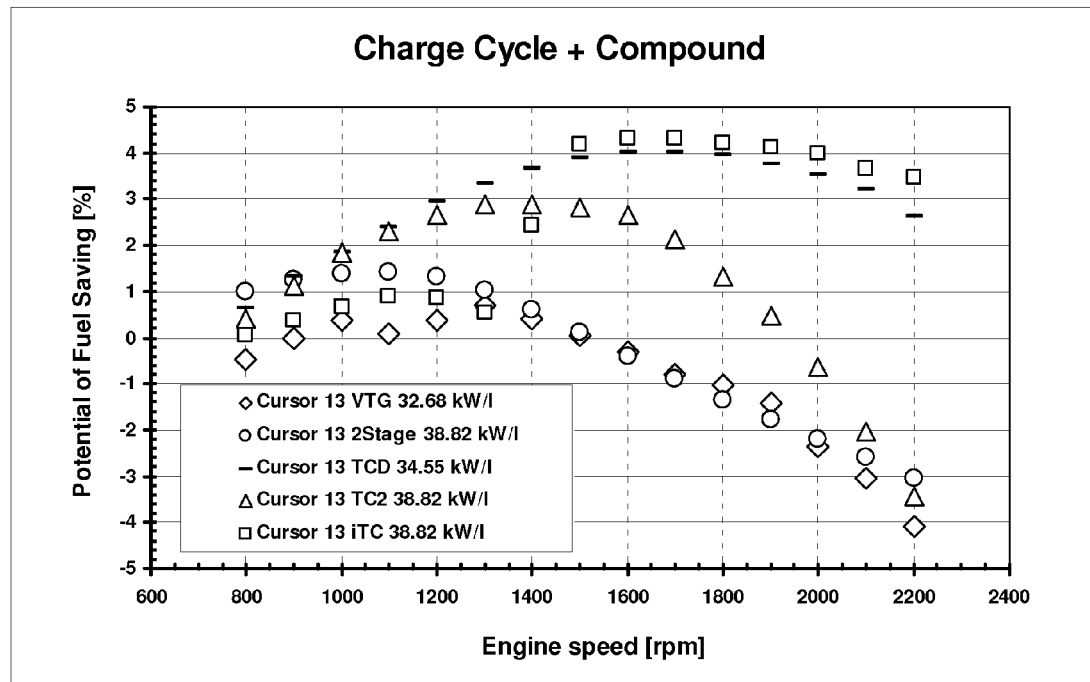
FIG. 4-6 show a comparison of several supercharging systems applied to the same boundary condition of the engine.
Figure 5:
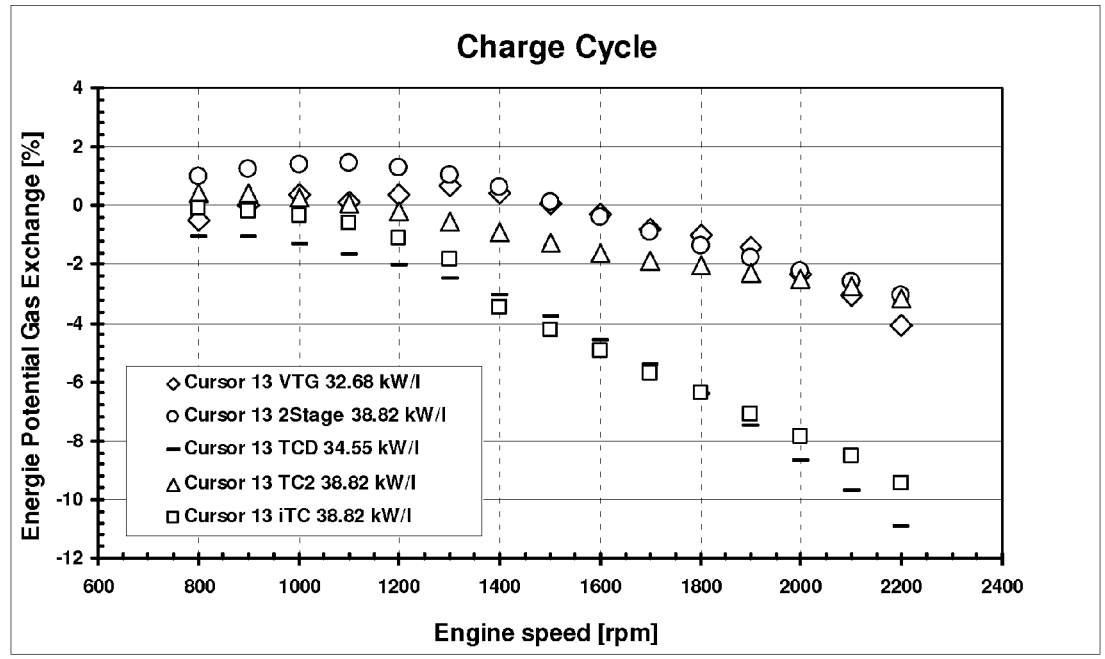
Figure 6:
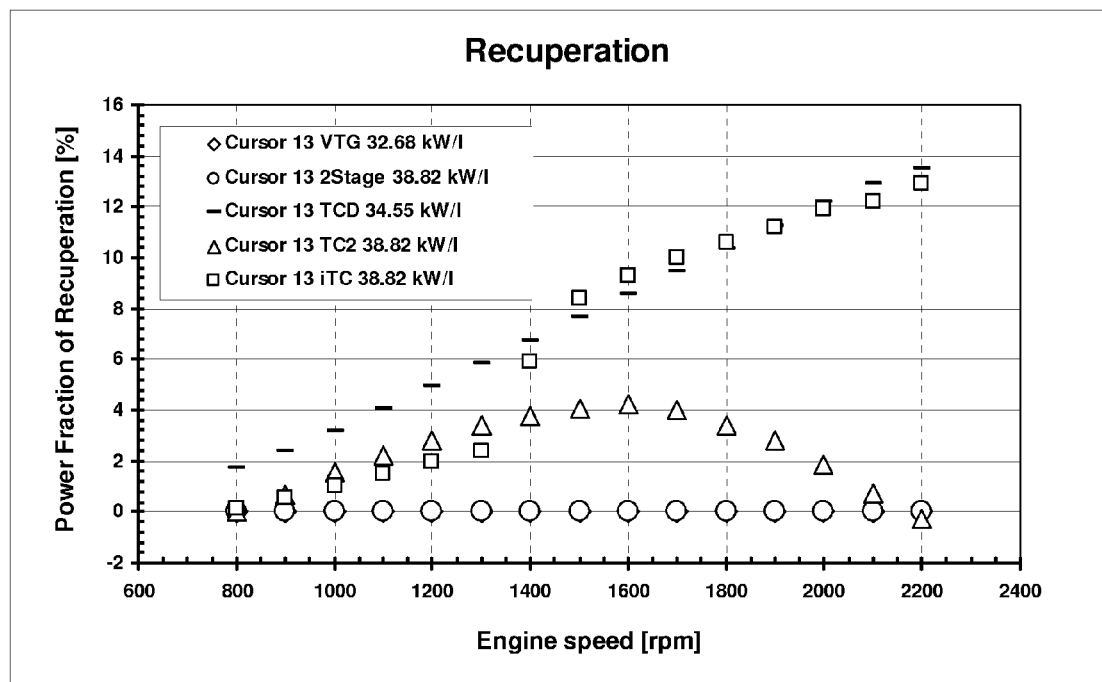

FIGS. 4, 5, and 6 show a comparison of several supercharging schemes applied to the same combustion engine (Cursor™) provided with:

7) a variable turbine geometry [VTG] (referred with empty rhombuses);
8) a two stage supercharger [2Stage] (referred with empty circles);
9) a first turbo-compound [TCD] With Single stage Turbocharging (referred with flat strokes);
10) a second turbo-compound [TC2], namely a Two stage turbocharging according to the scheme described on EP2042705 (referred with empty triangles);
11) the first embodiment of the present invention (iTC) (referred with empty rectangles).

In particular, the diagrams in the FIGS. 4-6 are plotted in order to show comparisons respectively of said quantities: POFS, EPEG, PFRC.

From 800-1500 rpm the engine of the apparatus according the present invention runs as a two stage turbo-compound system (HPC and LPT are connected to the crankshaft). From 1500-2200 rpm the HPC 5 is disconnected (first electric motor 32 stopped), while the LPT 7 is always activated. FIG. 4 shows that the scheme of the present invention gives a surprising reduction in fuel saving starting from about 1500 RPM of the engine crankshaft, with respect to the known schemes. In line with this result also the diagram on FIG. 6 shows a higher PFRC from 1500 REM. And FIG. 5 shows a lower EPEG starting from about 1500 RPM of the engine crankshaft.

It seems that the total POFC is lower with respect to the TCD scheme, however the power density of the scheme according to the present invention is increased: 34 kW/l TCD vs 38 kW/l iTC.

A right comparison should be carried out between the scheme of the present invention (iTC) and the TC2 according to the patent EP2042705, wherein both systems have the same power density. Hence the POFC is clearly improved.

According to the present invention, the free running two stage mode, i.e. HPC 5 and LPT 7 deactivated, may be used to gain more positive charge cycle work in operating areas under 50% of nominal power rating in the map. This functioning condition is not shown in the FIGS. 2-5.

The point of switching of the HPC and LPT is not fixed and depend on the engine properties, the power target, the turbines properties, etc.

Moreover, a better transient performance is achieved in respect of the scheme disclosed on EP2042705 and also with respect of the scheme disclosed on DE102005003714, because of the smaller air volume on the high pressure side for the high pressure layout. This cause also lower smoke levels at transient operation modes.

Moreover, with respect to a standard single stage Turbo-compound, the present invention shows:

a lower smoke emissions and lower working temperature at low engine speed,
the power density is strongly increased especially at low engine speed.

It has to be noted that in braking mode condition, the engine apparatus 1 according to the invention generates a higher brake torque at lower engine speeds, cause of the smaller high pressure turbine, i.e. higher boost, compared to the scheme disclosed both in EP2042705 and in DE102005003714.

Both the embodiments enable to reduce the power demand of the engine coupled supercharger at high engine speeds, when the target lambda is achieved. Hereby the Fuel consumption is strongly reduced.

Many changes, modifications, variations and other uses and applications of the subject invention will become apparent to those skilled in the art alter considering the specification and the accompanying drawings which disclose preferred embodiments thereof. All such changes, modifications, variations and other uses and applications which do not depart from the spirit and scope of the invention are deemed to be covered by this invention.

Further implementation details will not be described, as the man skilled in the art is able to carry out the invention starting from the teaching of the above description.

The invention claimed is:

1. An engine apparatus comprising:
an intermittent internal combustion engine (1), having an air intake line (2) and a exhaust line (20);
a low pressure compressor (11) and a high pressure compressor (5) arranged on said air intake line (2) according to the flow direction of the air;
a high pressure turbine and a low pressure turbine (7) arranged on said exhaust line according to the flow direction of the gases;
first bypass means for bypassing said high pressure compressor (5), wherein said high pressure turbine (6) is connected with a shaft to said low pressure compressor (11), said engine apparatus comprising a electrical torque converter (55) which comprises at least:
- an electric generator (30) connected so as to be driven by said low pressure turbine (7);
- a first electric motor (32) connected so as to drive said high pressure compressor (5), wherein said high pressure compressor is driven exclusively by the first electric motor;
- electronic conversion means (31) suitable to convert the electric energy produce by said electric generator (30) and to power supply and control at least said first electric motor (32).

2. An apparatus according to claim 1, wherein said high pressure compressor (5) is operated by said first electric motor (32) when at least one of said conditions occurs:
- a) an exhaust temperature exceeds a predefined value,
- b) said Lambda value is below a predefined value;
- c) said pressure ratio at the intake line (2) exceeds at least a surge value of said low pressure supercharger (11),
- d) engine brake means of said apparatus are activated,
- e) said engine speed is below a predefined value.

3. An apparatus according to claim 1, wherein said apparatus comprises an exhaust gas recirculation (EGR) system, said high pressure compressor (5) being operated by said first electric motor (32) if the pressure at the inlet of said engine is lower than the pressure at the outlet (20).

4. An apparatus according to claim 1, wherein said first bypassing means (3,4) are deactivated when said first electric motor (32) is operated by said electronic conversion means.

5. An apparatus according to claim 1, wherein said electric torque converter (55) comprise an accumulator (34) and wherein said electronic conversion means comprise an inverter (31) electrically connected to said accumulator (34), to said generator (30) and to said first electric motor (31).

6. An apparatus according to claim 5, wherein said electric torque converter (55) also comprises a second electric motor powered and controlled via said inverter (31).

7. An apparatus according to claim 5, wherein said electric torque converter (55) also comprises a condenser (39) electrically connected to said inverter (31) and wherein, in case of short term demand, said first electric motor (32) is powered, via said inverter (31), by means of the electric power coming from said condenser (39).

8. An apparatus according to claim 5, wherein in case of long term demand, said first electric motor (31) is powered, via said inverter (31), by means of electric energy coming from said condenser (39).

9. An apparatus according to claim 7, wherein said electric torque converter (55) also comprises an asynchronous machine (33b) mechanically connected to the crankshaft of said combustion engine (1) and electrically connected to said inverter (31).

10. An apparatus according to claim 9, wherein said asynchronous machine (33b) is operated, via said inverter (31), so as to work as an electrical generator during the braking/deceleration of said combustion engine (1).

11. An apparatus according to claim 9, wherein said asynchronous machine (33b) is operated, via said inverter (31), so as to work as an electric motor in case of power demand.

12. Vehicle especially an industrial vehicle comprising an apparatus according claim 1.

* * * * *